US012736980B2

(12) United States Patent
Zhu et al.

(10) Patent No.: US 12,736,980 B2
(45) Date of Patent: Sep. 15, 2026

(54) PATH FINDING METHOD AND APPARATUS FOR ROBOT, AND DEVICE, AND COMPUTER-READABLE STORAGE MEDIUM

(71) Applicant: SUZHOU CLEVA PRECISION MACHINERY & TECHNOLOGY CO., LTD., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 59 days.

(21) Appl. No.: 18/838,344

(22) PCT Filed: Feb. 23, 2023

(86) PCT No.: PCT/CN2023/077859

§ 371 (c)(1), (2) Date: Aug. 14, 2024

(87) PCT Pub. No.: WO2023/155928

PCT Pub. Date: Aug. 24, 2023

(65) Prior Publication Data

US 2025/0165006 A1 May 22, 2025

(30) Foreign Application Priority Data

Feb. 15, 2022 (CN) ........................ 202210138551.9

(51) Int. Cl.
*G05D 1/644* (2024.01)

(52) U.S. Cl.
CPC .................................... *G05D 1/644* (2024.01)

(58) Field of Classification Search
CPC .... G05D 1/644; G05D 1/229; G05D 2105/15; G05D 2107/23; G05D 2109/10;
(Continued)

(56) References Cited

U.S. PATENT DOCUMENTS

2020/0267896 A1* 8/2020 Ingvalson ............ A01D 34/008
2023/0158910 A1* 5/2023 Mandel-Senft ..... B60W 60/001 701/26

FOREIGN PATENT DOCUMENTS

CN 109947100 A * 6/2019
CN 113238549 A * 8/2021 ........... G05D 1/0214
(Continued)

OTHER PUBLICATIONS

International Search Report for Application No. PLCT/CN2023/077859, dated Jun. 17, 2023 with English Translation.

*Primary Examiner* — Bao Long T Nguyen
(74) *Attorney, Agent, or Firm* — JK Intellectual Property Law, PA

(57) ABSTRACT

A robot pathfinding method includes obtaining a position of a robot and a position of a charging base in a grid map; obtaining a shortest path from the position of the robot to the position of the charging base; determining candidate transfer stations from the position of the robot to the position of the charging base if the shortest path passes through obstacles; determining a first target transfer station corresponding to the position of the robot and a second target transfer station corresponding to the position of the charging base from the candidate transfer stations; obtaining all candidate transfer paths from the first target transfer station to the second target transfer station; taking the candidate path that is shortest and does not pass through obstacles as a target transfer path; and determining a target path from the position of the robot to the position of the charging base according to a path from the position of the robot to the first target transfer station, the target transfer path, and a path from the second target transfer station to the position of the charging base. Related apparatus, devices, and non-transitory computer-readable storage mediums are disclosed.

9 Claims, 4 Drawing Sheets

(58) Field of Classification Search
CPC .... G05D 1/2464; G05D 1/661; G05D 1/0225; G05D 1/0276; G05D 1/0214; A01D 34/008; G01C 21/34; Y02T 10/70
See application file for complete search history.

(56) References Cited

FOREIGN PATENT DOCUMENTS

| | | | |
|---|---|---|---|
| CN | 113934218 | A | 1/2022 |
| KR | 20090030683 | A | 3/2009 |

* cited by examiner

PATH FINDING METHOD AND APPARATUS FOR ROBOT, AND DEVICE, AND COMPUTER-READABLE STORAGE MEDIUM

CROSS-REFERENCE TO RELATED PATENT APPLICATIONS

This application is a national stage of International Application No. PCT/CN2023/077859, filed on Feb. 23, 2023, which claims priority to CN patent application No. 202210138551.9, filed on Feb. 15, 2022. All of the aforementioned applications are hereby incorporated by reference in their entireties.

TECHNICAL FIELD

The present disclosure relates to robot control technology, in particular to a robot pathfinding method and apparatus, a device, and a computer-readable storage medium.

BACKGROUND

Robot mowers have been gradually more widely used in life scenarios to help improve work efficiency.

In existing technologies, there are many robot pathfinding methods, including common A* algorithms and the principle of random no proximity.

The A* (A-Star) algorithm is the most effective direct search method for solving for a shortest path in a static road network, and is also an effective algorithm for solving many search problems. However, when the search space is relatively small, the A* algorithm has a relatively fast pathfinding speed, but when the search space is relatively large, the amount of computation is huge, the pathfinding speed of the algorithm is relatively slow, and the memory is prone to overflow.

The principle of random no proximity is for a robot to search in a direction within a search space. When encountering obstacles that cannot be avoided, the robot will search in a new direction. This method has long pathfinding time and low work efficiency

SUMMARY

The technical problem to be solved by embodiments of the present disclosure is to provide a robot pathfinding method and apparatus, a device, and a storage medium, with the advantages of small amount of computation and fast execution speed.

In order to solve the above technical problem, a first aspect of the present disclosure provides a robot pathfinding method, including:

obtaining a position of a robot and a position of a charging base in a grid map;

obtaining a shortest path from the position of the robot to the position of the charging base;

determining candidate transfer stations from the position of the robot to the position of the charging base in a case where the shortest path passes through obstacles;

determining a first target transfer station corresponding to the position of the robot and a second target transfer station corresponding to the position of the charging base from the candidate transfer stations;

obtaining all candidate transfer paths from the first target transfer station to the second target transfer station; taking the candidate path that is shortest and does not pass through obstacles as a target transfer path; and determining a target path from the position of the robot to the position of the charging base according to a path from the position of the robot to the first target transfer station, the target transfer path, and a path from the second target transfer station to the position of the charging base.

In a feasible implementation, before determining candidate transfer stations from the position of the robot to the position of the charging base in a case where the shortest path passes through obstacles, the method further includes:

determining whether the shortest path passes through obstacles; and determining that the shortest path is the target path from the position of the robot to the position of the charging base in a case that the shortest path does not pass through obstacles.

In a feasible implementation, before obtaining a position of a robot and a position of a charging base in a grid map, the method further includes:

obtaining a work path of the robot in a lawn area, where the charging base is located on the work path; and building the grid map according to the work path.

In a feasible implementation, the determining candidate transfer stations from the position of the robot to the position of the charging base includes:

drawing a bounding rectangle of the grid map, and determining a first reference point on four edges of the bounding rectangle respectively;

offsetting a group of opposite edges of the bounding rectangle from a center of the bounding rectangle by a first preset step to obtain two offset edges;

taking four points of intersection of the two offset edges and edges of the grid map as second reference points, and offsetting the two second reference points on the same offset edge oppositely by a second preset step to obtain four third reference points; and taking the third reference points as the candidate transfer stations.

In a feasible implementation, all the candidate transfer paths include:

a straight path from the first target transfer station to the second target transfer station and a path from the first target transfer station to the second target transfer station through at least one other candidate transfer station, where the other candidate transfer station refers to a candidate transfer station except the first target transfer station and the second target transfer station among the candidate transfer stations.

In a feasible implementation, the determining a first target transfer station corresponding to the position of the robot and a second target transfer station corresponding to the position of the charging base from the candidate transfer stations includes:

determining a first movement path from the position of the robot to each of the candidate transfer stations, and taking the candidate transfer station corresponding to the first movement path that is shortest and does not pass through obstacles as the first target transfer station; and determining a second movement path from the position of the charging base to each of the candidate transfer stations, and taking the candidate transfer station corresponding to the second movement path that is shortest and does not pass through obstacles as the second target transfer station.

Correspondingly, a second aspect of the present disclosure further provides a robot pathfinding apparatus, including:

a first obtaining module, configured to obtain a position of a robot and a position of a charging base in a grid map;

a second obtaining module, configured to obtain a shortest path from the position of the robot to the position of the charging base; and a first processing module, configured to determine candidate transfer stations from the position of the robot to the position of the charging base in a case that the shortest path passes through obstacles; determine a first target transfer station corresponding to the position of the robot and a second target transfer station corresponding to the position of the charging base from the candidate transfer stations; obtain all candidate transfer paths from the first target transfer station to the second target transfer station; take the candidate path that is shortest and does not pass through obstacles as a target transfer path; and determine a target path from the position of the robot to the position of the charging base according to a path from the position of the robot to the first target transfer station, the target transfer path, and a path from the second target transfer station to the position of the charging base.

In a feasible implementation, the apparatus further includes:

a determination module, configured to determine whether the shortest path passes through obstacles; and a second processing module, configured to determine that the shortest path is the target path from the position of the robot to the position of the charging base in a case that the shortest path does not pass through obstacles.

Correspondingly, a third aspect of the present disclosure further provides a device, including:

a memory, configured to store executable instructions; and a processor, configured to implement the robot pathfinding method described in the first aspect when executing the executable instructions stored in the memory.

Correspondingly, a fourth aspect of the present disclosure further provides a non-transitory computer-readable storage medium, including program code, where when the storage medium is run on an electronic device, the program code is used to enable the electronic device to perform the steps of the method in the first aspect.

The implementation of the present disclosure has the following beneficial effects:

According to the robot pathfinding method and apparatus, the device, and the computer-readable storage medium provided by the present disclosure, by obtaining a work path of a robot in a lawn area, building a grid map for the work path, obtaining a position of the robot and a position of a charging base in the grid map, and obtaining a shortest path from the position of the robot to the charging base. On the one hand, in a case that the shortest path does not pass through obstacles, the shortest path is determined as a target path from the position of the robot to the position of the charging base, without searching for the entire target path, which can greatly reduce the search for the target path, thereby reducing data processing volume on the search path, shortening search time, improving pathfinding speed, and enabling the robot to promptly return to the charging base; and On the other hand, in a case that the shortest path passes through obstacles, candidate transfer stations from the position of the robot to the position of the charging base are determined, a first target transfer station corresponding to the position of the robot and a second target transfer station corresponding to the position of the charging base are determined from the candidate transfer stations, and all candidate transfer paths are obtained from the first target transfer station to the second target transfer station; the candidate path that is shortest and does not pass through obstacles is taken as a target transfer path; and a target path from the position of the robot to the position of the charging base is determined according to a path from the position of the robot to the first target transfer station, the target transfer path, and a path from the second target transfer station to the position of the charging base, which avoid invalid data processing in disconnected areas, can reduce the amount of data computation for the target path on the basis of meeting required data for pathfinding, and can reduce data processing volume to some extent during pathfinding, thereby improving pathfinding speed and enabling the robot to promptly return to the charging base.

It should be understood that the above general description and the following detailed description are exemplary and explanatory only, and are not intended to limit the present application.

BRIEF DESCRIPTION OF THE DRAWINGS

The accompanying drawings here are incorporated into the description and constitute a part of the description, show embodiments consistent with the present application, and are used for explaining the principle of the present application together with the description, rather than constituting improper limitation to the present application.

DETAILED DESCRIPTION

In order to make the above objectives, features and advantages of the present disclosure more obvious and understandable, the specific embodiments of the present disclosure will be described in detail below with reference to the accompanying drawings. Many specific details are elaborated in the following description to facilitate full understanding of the present disclosure. However, the present disclosure can be implemented in many other ways different from those described herein, and those skilled in the art can make similar improvements without violating the content of the present disclosure. Therefore, the present disclosure is not limited by the specific embodiments disclosed below.

It should be noted that when one element is referred to as being "fixed" to another element, the element may be directly located on the other element, or a medium element may exist between the elements. When one element is considered to be "connected" to another element, the element may be directly connected to the other element, or a medium element may exist between the elements simultaneously. The terms "vertical", "horizontal", "left", "right", and similar expressions used herein are only for the purpose of illustration.

Unless otherwise defined, all technological and scientific terms used herein have the same meanings as commonly understood by those of ordinary skill in the technical field of the present disclosure. The terms used in the description of the present disclosure are only for the purpose of describing specific embodiments, but are not intended to limit the present disclosure. The term "and/or" used herein includes any and all combinations of one or more relevant listed items.

Figure 1:
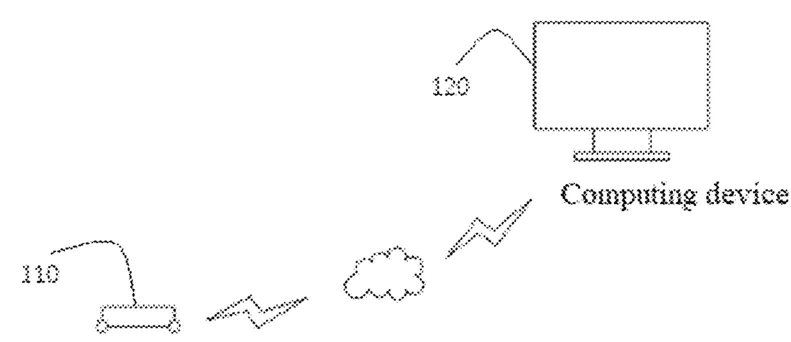
FIG. 1 is a schematic structural diagram of a pathfinding system used for implementing a robot pathfinding method of the present disclosure.

Referring to FIG. 1, FIG. 1 illustrates a pathfinding system. The method provided by the present application can be implemented in the pathfinding system.

In FIG. 1, the pathfinding system includes: a mobile service robot 110, a computing device 120, and a charging base. The computing device 120 is connected to the mobile service robot 110 in a wireless communication manner, and the computing device 120 is configured to send control information to the mobile service robot 110, so that the mobile service robot 110 moves towards the charging base.

The mobile service robot 110 may be equipped with a terminal device. The terminal device may be at least one of a smart phone, a game console, a desktop computer, a tablet computer, an e-book reader, an MP3 (Moving Picture Experts Group Audio Layer III) player, an MP4 (Moving Picture Experts Group Audio Layer IV) player, and a laptop portable computer.

The computing device 120 may be a single server, a cluster of a plurality of servers, or any one of a cloud computing platform and a virtual center, which is not limited in the embodiments of the present application. The server may communicate and connect with the terminal device through a wired or wireless network. The server may have functions such as data processing, data storage, and data transmission and reception, which are not limited in the embodiments of the present application.

The robot pathfinding method in the embodiments of the present application can be performed by the terminal device or the server.

Figure 2:
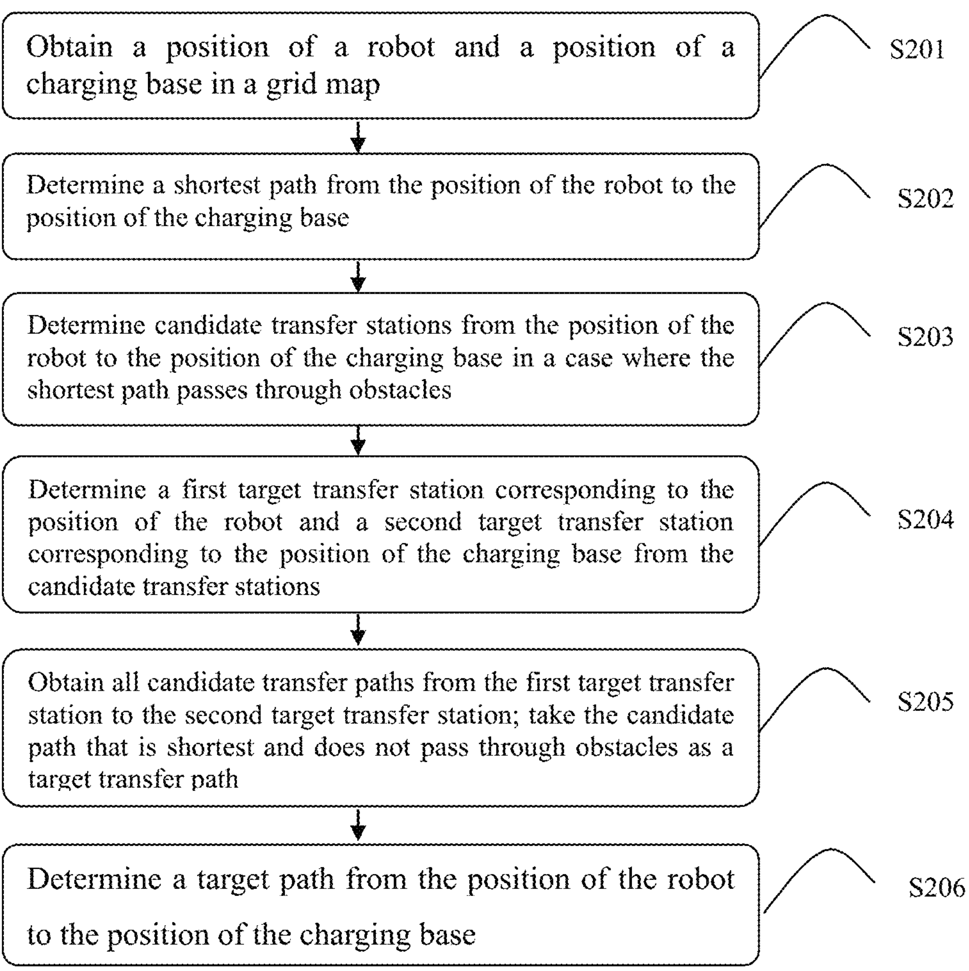
FIG. 2 is a schematic flowchart of an embodiment of a robot pathfinding method in the present disclosure.
Figure 3:
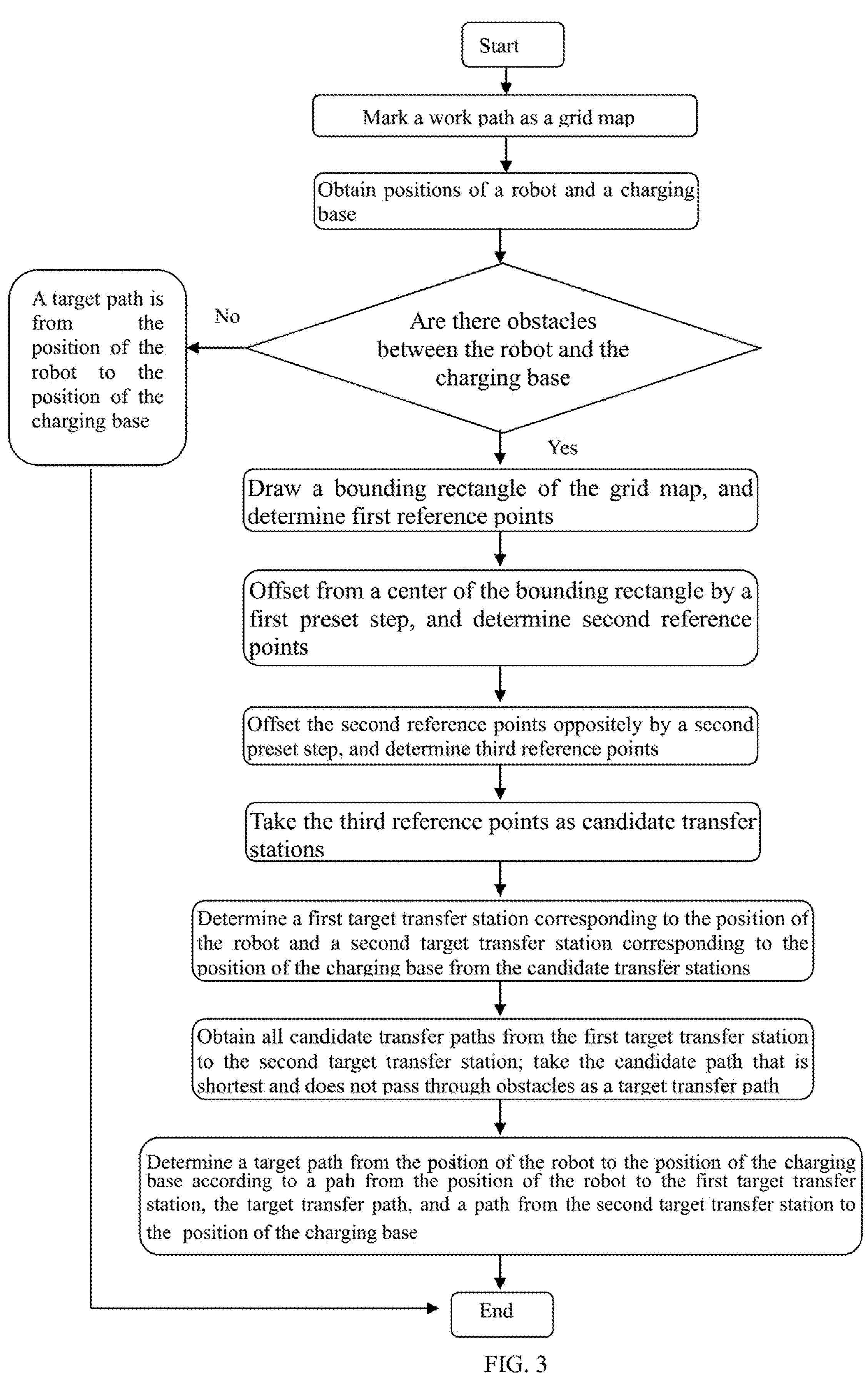
FIG. 3 is an exemplary explanatory diagram of a robot pathfinding process in the present disclosure.

Referring to FIG. 2, FIG. 2 is a schematic flowchart of an embodiment of a robot pathfinding method in the present disclosure. Notably, although the logical order is shown in the flowchart, the steps shown or described can be performed in a different order than here in some cases. In this embodiment, the robot pathfinding method includes steps S201 to S206.

S201. Obtain a position of a robot and a position of a charging base in a grid map.

Before the position of the robot and the position of the charging base in the grid map are determined, the grid map (see FIG. 5) may be built first. In an embodiment of the present disclosure, the grid map may be built through a work path of the robot, including steps (1)-(3):

(1) Obtain a work path of the robot in a lawn area, where the work path refers to a travel path of the robot starting from the charging base, and the charging base is located on the work path. The work path may be represented as a collection of positions. A device such as a laser acquisition device, a depth camera, or a sensor can periodically collect position information of the robot to obtain the positions.

(2) Build the grid map according to the work path.

In a possible implementation, an outline of the grid map may be built according to the work path, and obstacles within a range delineated by the outline are identified, where the obstacles include non-lawn areas and items placed in the lawn area.

(3) Determine the position of the robot and the position of the charging base in the grid map.

Figure 5:
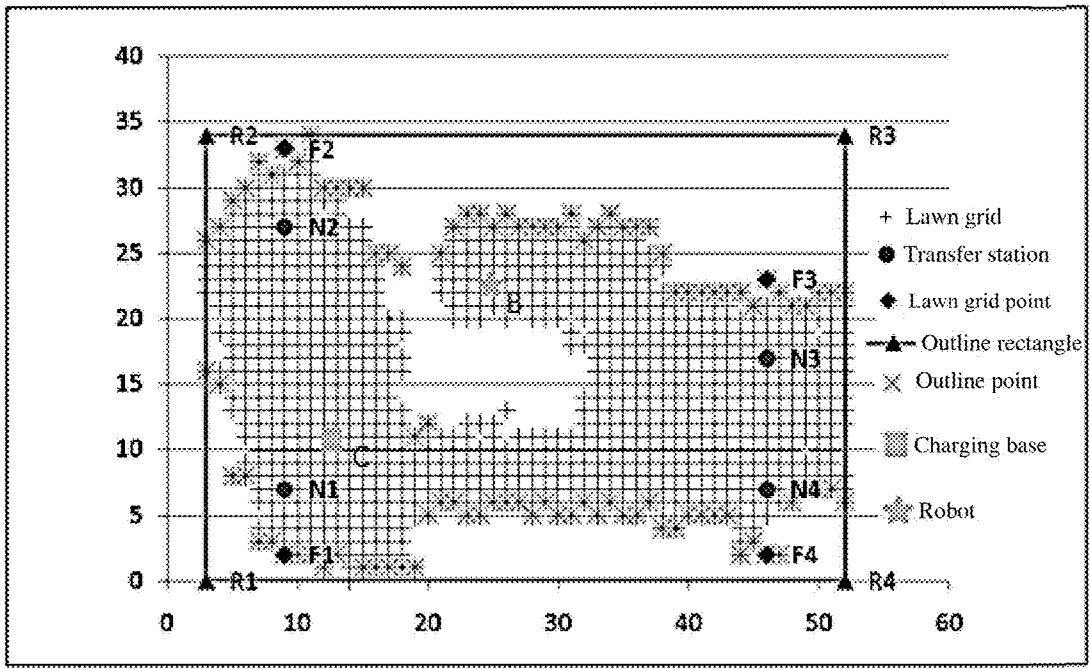
FIG. 5 is a schematic diagram of a grid map used for a robot pathfinding process in the present disclosure.

As shown in FIG. 5, the horizontal and vertically cross-hatched portion is the lawn grid portion of the grid map, the diagonally cross-hatched portion is the outline (edge) of the lawn grid portion of the grid map, B is the position of the robot, and C is the position of the charging base. The numbers on the x-axis and the y-axis indicate distance in meters.

S202. Determine a shortest path from the position of the robot to the position of the charging base.

The shortest path may be represented as a straight line connecting the position of the robot with the position of the charging base.

After the shortest path from the position of the robot to the position of the charging base is obtained, whether the shortest path passes through obstacles can be further determined; and if the shortest path does not pass through obstacles, it indicates that the robot can approach the charging base in a straight traveling manner from its current position, so it can be determined that the shortest path is a target path from the position of the robot to the position of the charging base; or if the shortest path passes through obstacles, step S203 is performed.

S2031: Draw a bounding rectangle of the grid map (corners at R1, R2, R3, and R4 in FIG. 5), and determine a first reference point on four edges of the bounding rectangle respectively.

In a possible implementation, the candidate transfer stations may be determined as follows:

S2031: Draw a bounding rectangle of the grid map, and determine a first reference point on four edges of the bounding rectangle respectively.

Due to the higher probability that the grid map is irregular, in order to ensure that points determined by subsequent offset can fall as much as possible within the grid map, the design of the bounding rectangle may follow the following principle: minimize as much as possible the area between the bounding rectangle and the outline of the grid map. Guided by this principle, the long and short edges of the bounding rectangle may not necessarily extend along an X or Y axis.

S2033: Offset a group of opposite edges of the bounding rectangle from a center of the bounding rectangle by a first preset step to obtain two offset edges.

The center of the bounding rectangle refers to a point of intersection of two diagonals of the bounding rectangle. The bounding rectangle has two groups of opposite edges, and two edges in one group are moved oppositely by the first preset step to obtain two offset edges. Each offset edge intersects with the outline (edges) of the grid map at two points, and these points of intersection are used as second reference points.

S2035: Take four points of intersection of the two offset edges and edges of the grid map as second reference points, and offset the two second reference points on the same offset edge oppositely by a second preset step to obtain four third reference points.

S2037: Take the third reference points as the candidate transfer stations.

With reference to FIG. 5, diagonally cross-hatched outline points in the figure form the outline of the lawn grid portion of the grid map to define a boundary of the traveling lawn area, that is, the area within the outline is a traveling area for the robot.

In this embodiment, points at two ends of lawn grids in a y-axis direction are selected as desired outline points. Similarly, all edge points in an x-axis direction may alternatively be selected. In this case, the points at two ends in the y-axis direction are used to reduce the amount of data.

In this embodiment, a minimum bounding rectangle is selected to set at most four transfer stations, which can meet general lawn shapes. Therefore, the minimum bounding rectangle may be said closest to the shape of lawn grids, and the generated rectangle may not necessarily be horizontally oriented along the x-axis.

The outline rectangle obtained in this embodiment is represented by four points (R1 to R4) as shown in FIG. 5. However, the four points of the obtained rectangle may not necessarily fall within the lawn grid area, so further offset is needed to ensure that the transfer stations fall within the grid area.

In order to ensure that the transfer stations fall within the grid area, it is not limited to the method of this embodiment. The two steps in this embodiment can be combined into one.

Because the precision of a positioning system is about 3 m, twice the precision is used as an offset reference value in this embodiment, such as offset=6 m, where Max is a maximum size of the entire grid map.

R1R2 edge is translated with R1R4 as a horizontal direction by a (offset-Max) unit, then translated based on R1R4 edge to a lawn grid point F1, and translated to the last lawn grid point F2. R3R4 edge is translated with R1R4 as a horizontal direction by a (offset-Max) unit, then R1R4 edge is translated to a lawn grid point F4 and translated to the last lawn grid point F3. Due to the presence of an edge position of a lawn grid at the transfer station Fn, if their distance is greater than the offset, a transfer station Nn inside the lawn grid can be further obtained. In this case, [En] F1, F2, F3, and F4 are is moved inwards by the offset unit in forward and backward directions on the Y-axis respectively to obtain N1, N2, N3, and N4.

The obtained N1, N2, N3, and N4 are candidate transfer stations.

S204. Determine a first target transfer station corresponding to the position of the robot and a second target transfer station corresponding to the position of the charging base from the candidate transfer stations.

After four candidate transfer stations are obtained in S203:

a first movement path from the position of the robot to each of the candidate transfer stations is determined, and the candidate transfer station corresponding to the first movement path that is shortest and does not pass through obstacles is taken as the first target transfer station; and a second movement path from the position of the charging base to each of the candidate transfer stations is determined, and the candidate transfer station corresponding to the second movement path that is shortest and does not pass through obstacles is taken as the second target transfer station.

S205. Obtain all candidate transfer paths from the first target transfer station to the second target transfer station; take the candidate path that is shortest and does not pass through obstacles as a target transfer path.

All the candidate transfer paths include: a straight path from the first target transfer station to the second target transfer station and a path from the first target transfer station to the second target transfer station through at least one other candidate transfer station, where the other candidate transfer station refers to a candidate transfer station except the first target transfer station and the second target transfer station among the candidate transfer stations.

The first target transfer station corresponding to the position of the robot and the second target transfer station corresponding to the position of the charging base are determined from the candidate transfer stations; all the candidate transfer paths from the first target transfer station to the second target transfer station are obtained; and the candidate path that is shortest and does not pass through obstacles is taken as the target transfer path.

Two points among the transfer stations Ni (i=1, 2, 3, 4) are selected as the first target transfer station and the second target transfer station, respectively, where the first target transfer station closest to the position of the robot is Sm (m=1, 2, 3, 4), and the second target transfer station closest to the position of the charging base is En (n=1, 2, 3, 4);

With reference to FIG. 5, this embodiment provides a target path of the robot to return to the charging base after working. The first target transfer station closest to the robot is N2, namely, m=2; the second target transfer station closest to the charging base is N1, namely, n=1; therefore, the first target transfer station is S2, and the second target transfer station is E1;

General rules for generating a home path, i.e., general rules for the robot to travel from the first target transfer station to the second target transfer station are as follows:

The robot can travel clockwise or counterclockwise; the four candidate transfer stations N1, N2, N3, and N4 form a circular path in sequence.

a. If m=n, if clockwise, the home path shows that Nm+1 is the first target transfer station, Nn is the second target transfer station, sorted in ascending order, and the number of transfer stations is 4;

b. If m=n, if counterclockwise, the home path shows that Nm−1 is the first target transfer station, Nn is the second target transfer station, sorted in descending order, and the number of transfer stations is 4;

c. If m<n, if clockwise, the home path shows that Nm is the first target transfer station, Nn is the second target transfer station, sorted in ascending order, and the number of transfer stations is n−m+1;

d. If m<n, if counterclockwise, the home path shows that Nm is the first target transfer station, Nn is the second target transfer station, sorted in descending order, and the number of transfer stations is 5−n+m;

e. If m>n, if clockwise, the home path shows that Nm is the first target transfer station, Nn is the second target transfer station, sorted in ascending order, and the number of transfer stations is 5−m+n;

f. If m>n, if counterclockwise, the home path shows that Nm is the first target transfer station, Nn is the second target transfer station, sorted in descending order, and the number of transfer stations is m−n+1;

g. When the robot cannot reach the first destination transfer station clockwise or counterclockwise, the first destination transfer station is changed into the next transfer station in the path;

m=2, n=1, and m>n conform to rules e and f, the clockwise travel path is N2→N3→N4→N1, and the counterclockwise travel path is N2→N1. However, starting from point B, the robot cannot reach the first target transfer station N2 in actual situations, which conforms to rule g. By changing the first target transfer station into the next transfer station, a path N3→N4→N1 will be generated to obtain a target transfer path.

S206. Determine a target path from the position of the robot to the position of the charging base.

The target path from the position of the robot to the position of the charging base is determined according to a path from the position of the robot to the first target transfer station, the target transfer path, and a path from the second target transfer station to the position of the charging base.

With reference to S205, the target path for the robot to return to the charging base in this embodiment is the position of the robot→N3→N4→N1→the position of the charging base.

According to the robot pathfinding method and apparatus, the device, and the computer-readable storage medium provided by the present disclosure, by obtaining a work path of a robot in a lawn area, building a grid map for the work path, obtaining a position of the robot and a position of a charging base in the grid map, and obtaining a shortest path from the position of the robot to the charging base. On the one hand, in a case that the shortest path does not pass through obstacles in a case that the shortest path does not pass through obstacles, the shortest path is determined as a target path from the position of the robot to the position of the charging base, without searching for the entire target path, which can greatly reduce the search for the target path, thereby reducing data processing volume on the search path, shortening search time, improving pathfinding speed, and enabling the robot to promptly return to the charging base; and On the other hand, in a case that the shortest path passes through obstacles, candidate transfer stations from the position of the robot to the position of the charging base are determined, a first target transfer station corresponding to the position of the robot and a second target transfer station corresponding to the position of the charging base are determined from the candidate transfer stations, and all candidate transfer paths are obtained from the first target transfer station to the second target transfer station; the candidate path that is shortest and does not pass through obstacles is taken as a target transfer path; and a target path from the position of the robot to the position of the charging base is determined according to a path from the position of the robot to the first target transfer station, the target transfer path, and a path from the second target transfer station to the position of the charging base, which avoid invalid data processing in disconnected areas, can reduce the amount of data computation for the target path on the basis of meeting required data for pathfinding, and can reduce data processing volume to some extent during pathfinding, thereby improving pathfinding speed and enabling the robot to promptly return to the charging base.

Figure 4:
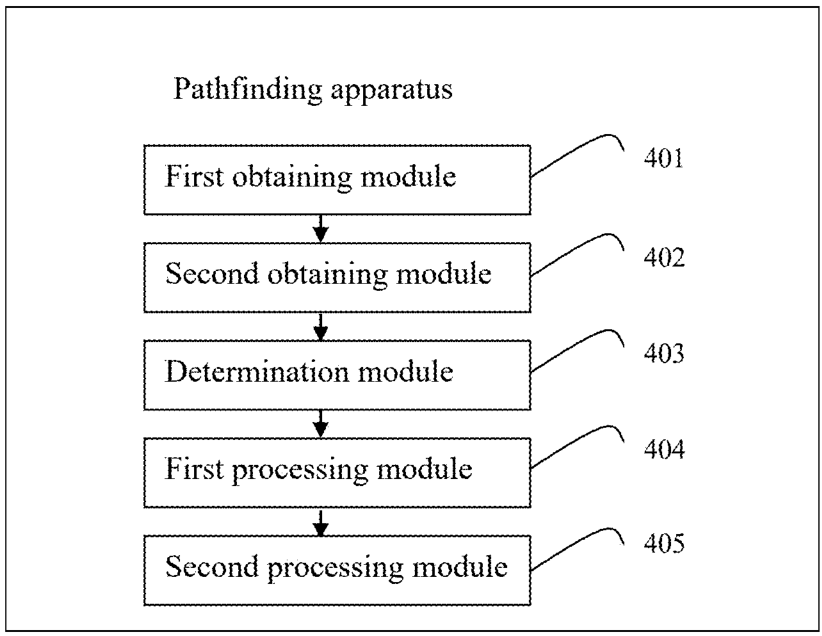
FIG. 4 is a structural block diagram of a robot pathfinding apparatus of the present disclosure.

FIG. 4 illustrates a block diagram of a pathfinding apparatus according to an embodiment of the present disclosure. With reference to FIG. 4, a pathfinding apparatus includes a first obtaining module 401, a second obtaining module 402, and a first processing module 404.

The first obtaining module 401 is configured to obtain a position of a robot and a position of a charging base in a grid map;

The second obtaining module 402 is configured to obtain a shortest path from the position of the robot to the position of the charging base; and The first processing module 404 is configured to determine candidate transfer stations from the position of the robot to the position of the charging base in a case that the shortest path passes through obstacles; determine a first target transfer station corresponding to the position of the robot and a second target transfer station corresponding to the position of the charging base from the candidate transfer stations; obtain all candidate transfer paths from the first target transfer station to the second target transfer station; take the candidate path that is shortest and does not pass through obstacles as a target transfer path; and determine a target path from the position of the robot to the position of the charging base according to a path from the position of the robot to the first target transfer station, the target transfer path, and a path from the second target transfer station to the position of the charging base.

In a possible implementation, the pathfinding apparatus may further include a determination module 403 and a second processing module 405.

The determination module 403 is configured to determine whether the shortest path passes through obstacles; and The second processing module 405 is configured to determine that the shortest path is the target path from the position of the robot to the position of the charging base in a case that the shortest path does not pass through obstacles.

It should be understood that the first obtaining module 401, the second obtaining module 402, and the first processing module 404 shown in FIG. 4 may be included in the computing device 120 described with reference to FIG. 1. Moreover, it should be understood that the modules shown in FIG. 4 may perform the steps or operations in the methods or processes of the embodiments of the present disclosure.

Figure 6:
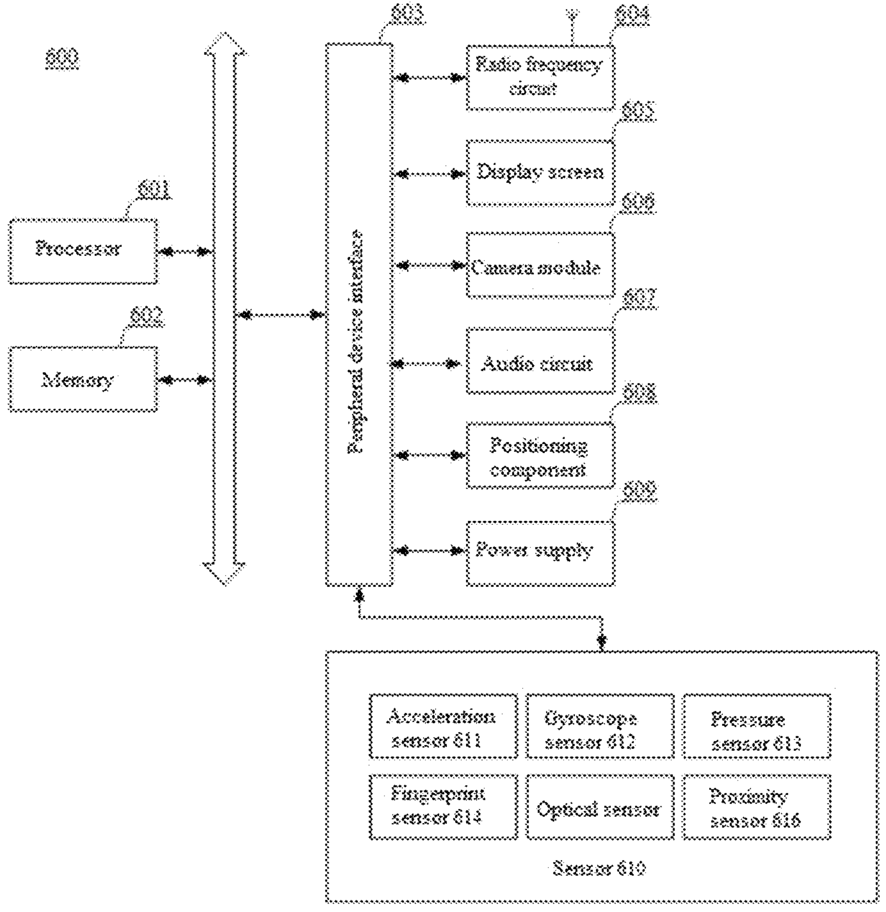
FIG. 6 is a schematic structural diagram of a terminal device provided by the present disclosure.

FIG. 6 illustrates a structural block diagram of a terminal device provided by an exemplary embodiment of the present application. The terminal device 600 may be a portable mobile terminal, such as a smart phone, a tablet computer, an MP3 (Moving Picture Experts Group Audio Layer III) player, an MP4 (Moving Picture Experts Group Audio Layer IV) player, a laptop computer, or a desktop computer. The terminal device 600 may also be referred to as user equipment, a portable terminal, a laptop terminal, a desktop terminal, or the like.

Generally, the terminal device 600 includes a processor 601 and a memory 602.

The processor 601 may include one or more processing cores, such as a 4-core processor or an 8-core processor. The processor 601 may be implemented in at least one hardware form of DSP (Digital Signal Processing), FPGA (Field-Programmable Gate Array), or PLA (Programmable Logic Array). The processor 601 may alternatively include a main processor and co-processors, where the main processor is a processor configured to process data in a wake-up state, and is also known as a CPU (Central Processing Unit); and the co-processors are low-power processors configured to process data in a standby state. In some embodiments, the processor 601 may be integrated with a GPU (Graphics Processing Unit). The GPU is configured to render and draw content to be displayed on a display screen. In some embodiments, the processor 601 may further include an AI (Artificial Intelligence) processor for processing computational operations related to machine learning.

The memory 602 may include one or more computer-readable storage media. The computer-readable storage medium may be non-transitory. The memory 602 may further include a high-speed random access memory and a non-volatile memory, such as one or more disk storage devices or flash storage devices. In some embodiments, the non-transient computer-readable storage medium in the memory 602 is used for storing at least one instruction, and the at least one instruction is executed by the processor 601 to implement the robot pathfinding method provided by the method embodiments of the present application.

In some embodiments, the terminal device 600 may further optionally include a peripheral device interface 603 and at least one peripheral device. The processor 601, the memory 602, and the peripheral device interface 603 may be connected by a bus or a signal cable. Each peripheral device may be connected to the peripheral device interface 603 by a bus, a signal cable, or a circuit board. Specifically, the peripheral device includes at least one of a radio frequency circuit 604, a display screen 605, a camera module 606, an audio circuit 607, a positioning component 608, and a power supply 609.

The peripheral device interface 603 may be configured to connect the at least one peripheral device related to I/O (Input/Output) to the processor 601 and the memory 602. In some embodiments, the processor 601, the memory 602, and the peripheral device interface 603 are integrated on the same chip or circuit board. In some other embodiments, any one or two of the processor 601, the memory 602, and the peripheral device interface 603 may be implemented on a separate chip or circuit board. This embodiment is not limited thereto.

The radio frequency circuit 604 is configured to receive and transmit RF (Radio Frequency) signals, also referred to as electromagnetic signals. The radio frequency circuit 604 communicates with a communication network and other communication devices through electromagnetic signals. The radio frequency circuit 604 converts electrical signals into electromagnetic signals for transmission, or converts received electromagnetic signals into electrical signals. Optionally, the radio frequency circuit 604 includes: an antenna system, an RF transceiver, one or more amplifiers, a tuner, an oscillator, a digital signal processor, an encoding and decoding chip set, a subscriber identity module card, and the like. The radio frequency circuit 604 may communicate with other terminals through at least one wireless communication protocol. The wireless communication protocol includes, but is not limited to: World Wide Web, metropolitan area networks, intranets, various generations of mobile communication networks (2G, 3G, 4G, and 5G), wireless local area networks, and/or WiFi (Wireless Fidelity) networks. In some embodiments, the radio frequency circuit 604 may further include NFC (Near Field Communication) related circuits, which are not limited by the present application.

The display screen 605 is configured to display a UI (User Interface). The UI may include graphics, text, icons, videos, and any combination thereof. When the display screen 605 is a touch screen, the display screen 605 further has the capability of collecting touch signals on or above the surface of the display screen 605. The touch signals may be input as control signals to the processor 601 for processing. In this case, the display screen 605 may further be configured to provide virtual buttons and/or virtual keyboards, also known as soft buttons and/or soft keyboards. In some embodiments, one display screen 605 may be configured and disposed on a front panel of the terminal device 600. In other embodiments, at least two display screen 605 may be configured and disposed on different surfaces of the terminal device 600 or folded. In other embodiments, the display screen 605 may be a flexible display screen disposed on a curved or folded surface of the terminal device 600. Even, the display screen 605 may be configured as a non-rectangular irregular shape, namely, an irregular screen. The display screen 605 may be made of a material such as LCD (Liquid Crystal Display) and OLED (Organic Light Emitting Diode).

The camera module 606 is configured to capture images or videos. Optionally, the camera module 606 includes a front camera and a rear camera. Generally, the front camera is disposed on a front panel of the terminal, and the rear camera is disposed on a rear side of the terminal. In some embodiments, there are at least two rear cameras, either a main camera, a depth of field camera, a wide-angle camera, or a telephoto camera, where the fusion of the main camera and the depth of field camera achieves a background blurring function, and the fusion of the main camera and the wide-angle camera achieves panoramic shooting and VR (Virtual Reality) shooting functions or other fusion shooting functions. In some embodiments, the camera module 606 may further include a flash. The flash may be a monochrome or dual color temperature flash. The dual color temperature flash refers to a combination of a warm light flash and a cold light flash, which can be used for light compensation at different color temperatures.

The audio circuit 607 may include a microphone and a speaker. The microphone is configured to collect sound waves from a user and an environment, convert the sound waves into electrical signals, and input the electrical signals to the processor 601 for processing, or input the electrical signals to the radio frequency circuit 604 for voice communication. For the purpose of stereo collection or noise reduction, a plurality of microphones may be configured and disposed at different parts of the terminal device 600 respectively. The microphone may alternatively be an array microphone or an all-directional collection microphone. The speaker is configured to convert the electrical signals from the processor 601 or the radio frequency circuit 604 into sound waves. The speaker may be a conventional thin film speaker or a piezoelectric ceramic speaker. When the speaker is a piezoelectric ceramic speaker, the speaker can not only convert the electrical signals into sound waves that can be heard by humans, but also can convert the electrical signals into sound waves that cannot be heard by humans for ranging and other purposes. In some embodiments, the audio circuit 607 may further include a headphone jack.

The positioning component 608 is configured to position the current geographic location of the terminal device 600 for navigation or LBS (Location Based Service). The positioning component 608 may be based on GPS (Global Positioning System) of the United States, the Beidou system of China, or the Galileo system of Russia.

The power supply 609 is configured to supply power to various components in the terminal device 600. The power supply 609 may be alternating current, direct current, a disposable battery, or a rechargeable battery. When the power supply 609 includes a rechargeable battery, the rechargeable battery may be a wired rechargeable battery or a wireless rechargeable battery. The wired rechargeable battery charges power through a wire circuit, while the wireless rechargeable battery charges power through a wireless coil. The rechargeable battery may alternatively be configured to support fast charging technology.

In some embodiments, the terminal device 600 further includes one or more sensors 610. The one or more sensors 610 include, but are not limited to: an acceleration sensor 611, a gyroscope sensor 612, a pressure sensor 613, a fingerprint sensor 614, an optical sensor 615, and a proximity sensor 616.

The acceleration sensor 611 may detect a magnitude of acceleration on three coordinate axes of a coordinate system established by the terminal device 600. For example, the acceleration sensor 611 may be configured to detect components of gravitational acceleration on the three coordinate axes. The processor 601 may control the display screen 605 to display the user interface in a horizontal or vertical view according to gravity acceleration signals collected by the acceleration sensor 611. The acceleration sensor 611 may further be configured to collect game or user's motion data.

The gyroscope sensor 612 may detect the body direction and rotation angle of the terminal device 600. The gyroscope sensor 612 may collaborate with the acceleration sensor 611 to collect user's 3D actions on the terminal device 600. According to the data collected by the gyroscope sensor 612, the processor 601 may achieve the following functions: action sensing (such as changing the UI according to user's tilt operation), image stabilization during shooting, game control, and inertial navigation.

The pressure sensor 613 may be disposed on a side border of the terminal device 600 and/or a lower layer of the display screen 605. When the pressure sensor 613 is disposed on the side border of the terminal device 600, it can detect user's grip signals on the terminal device 600, and the processor 601 performs left and right hand recognition or fast operation according to the grip signals collected by the pressure sensor 613. When the pressure sensor 613 is disposed on the lower layer of the display screen 605, the processor 601 controls an operable control on the UI according to a user's pressure operation on the display screen 605. The operable control includes at least one of a button control, a scroll bar control, an icon control, and a menu control.

The fingerprint sensor 614 is configured to collect user's fingerprints, and the processor 601 identifies user's identity according to the fingerprints collected by the fingerprint sensor 614, or the fingerprint sensor 614 identifies user's identity according to the collected fingerprints. When the user's identity is identified as a trusted identity, the processor 601 authorizes the user to perform relevant sensitive operations, including unlocking the screen, viewing encrypted information, downloading software, making payments, changing settings, and the like. The fingerprint sensor 614 may be disposed on a front, rear, or lateral surface of the terminal device 600. When a physical button or manufacturer Logo is disposed on the terminal device 600, the fingerprint sensor 614 may be integrated with the physical button or manufacturer Logo.

The optical sensor 615 is configured to collect ambient light intensity. In one embodiment, the processor 601 may control the display brightness of the display screen 605 according to the ambient light intensity collected by the optical sensor 615. Specifically, when the ambient light intensity is high, the display brightness of the display screen 605 is increased. When the ambient light intensity is low, the display brightness of the display screen 605 is decreased. In another embodiment, the processor 601 may further dynamically adjust shooting parameters of the camera module 606 according to the ambient light intensity collected by the optical sensor 615.

The proximity sensor 616, also known as a distance sensor, is usually disposed on the front panel of the terminal device 600. The proximity sensor 616 is configured to collect the distance between the user and the front side of the terminal device 600. In one embodiment, when the proximity sensor 616 detects that the distance between the user and the front side of the terminal device 600 gradually decreases, the processor 601 controls the display screen 605 to switch from a bright state to a quiet state; or when the proximity sensor 616 detects that the distance between the user and the front side of the terminal device 600 gradually increases, the processor 601 controls the display screen 605 to switch from a quiet state to a bright state.

Those skilled in the art may understand that the structure shown in FIG. 6 does not constitute a limitation on the terminal device 600, and the terminal device may include more or fewer components than those shown in the figure, or some components may be combined, or a different component deployment may be used.

Figure 7:
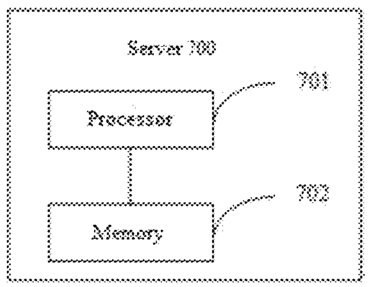
FIG. 7 is a schematic structural diagram of a server provided by the present disclosure.

FIG. 7 is a schematic structural diagram of a server provided by an embodiment of the present application. The server 700 may be greatly different due to different configuration or performance, and may include one or more processors 701 and one or more memories 702, where the one or more memories 702 store at least one program code, and the at least one program code is loaded and executed by the one or more processors 701 to implement the robot pathfinding method provided by the above method embodiments. For example, the processor 701 is a CPU. Alternatively, the server 700 may have components such as a wired or wireless network interface, a keyboard, and an input/output interface for input and output. The server 700 may further include other components for implementing device functions, which will not be elaborated here.

In an exemplary embodiment, a computer-readable storage medium is further provided. The storage medium stores at least one program code, and the at least one program code is loaded and executed by a processor, so that an electronic device implements any of the above robot pathfinding methods.

Optionally, the computer-readable storage medium may be a read-only memory (ROM), a random access memory (RAM), a compact disc read-only memory (CD-ROM), a magnetic tape, a floppy disk, an optical data storage device, and the like.

In an exemplary embodiment, a computer program or computer program product is further provided. The computer program or computer program product stores at least one computer instruction, and the at least one computer instruction is loaded and executed by a processor, so that a computer implements any of the above robot pathfinding methods.

It should be understood that the term "plurality" herein means two or more. The term "and/or" describes an association relationship of associated objects, indicating three relationships, for example, A and/or B may indicate that A exists alone, A and B exist at the same time, and B exists alone. The character "/" generally indicates an "or" relationship between successive associated objects.

The sequence numbers of the foregoing embodiments of the present application are merely for the convenience of description, and do not imply the preference among the embodiments.

The foregoing descriptions are merely exemplary embodiments of the present application, but are not intended to limit the present application. Any modification, equivalent replacement, or improvement made within the principle of the present application shall fall within the scope of protection of the present application.

We claim:

1. A robot pathfinding method for driving a robot to a charging base, the method comprising the steps of:

obtaining a position of a robot and a position of a charging base in a grid map;

obtaining a shortest path, the shortest path being from the position of the robot to the position of the charging base;

determining candidate transfer stations from the position of the robot to the position of the charging base if the shortest path passes through obstacles;

determining a first target transfer station corresponding to the position of the robot and a second target transfer station corresponding to the position of the charging base from the candidate transfer stations;

obtaining all candidate transfer paths from the first target transfer station to the second target transfer station;

taking the candidate path that is shortest and does not pass through obstacles as a target transfer path;

determining a target path from the position of the robot to the position of the charging base according to a path from the position of the robot to the first target transfer station, the target transfer path, and a path from the second target transfer station to the position of the charging base; and driving the robot along the target path to the charging base, wherein the step of determining candidate transfer stations from the position of the robot to the position of the charging base comprises the steps of:

drawing a bounding rectangle of the grid map, and determining a first reference point on four edges of the bounding rectangle respectively;

offsetting a group of opposite edges of the bounding rectangle from a center of the bounding rectangle by a first preset step to obtain two offset edges;

taking four points of intersection of the two offset edges and edges of the grid map as second reference points, and offsetting the two second reference points on the same offset edge oppositely by a second preset step to obtain four third reference points; and taking the third reference points as the candidate transfer stations.

2. The robot pathfinding method according to claim 1, wherein before the step of determining candidate transfer stations from the position of the robot to the position of the charging base if the shortest path passes through obstacles, the method further comprises the steps of:

determining whether the shortest path passes through obstacles; and determining that the shortest path is the target path from the position of the robot to the position of the charging base if the shortest path does not pass through obstacles.

3. The robot pathfinding method according to claim 1, wherein before the step of obtaining a position of a robot and a position of a charging base in a grid map, the method further comprises the steps of:

obtaining a work path of the robot in a lawn area, wherein the charging base is located on the work path; and building the grid map according to the work path.

4. The robot pathfinding method according to claim 1, wherein all the candidate transfer paths comprise:

a straight path from the first target transfer station to the second target transfer station and a path from the first target transfer station to the second target transfer station through at least one other candidate transfer station, wherein the other candidate transfer station refers to a given candidate transfer station other than either the first target transfer station or the second target transfer station among the candidate transfer stations.

5. The robot pathfinding method according to claim 1, wherein the step of determining a first target transfer station corresponding to the position of the robot and a second target transfer station corresponding to the position of the charging base from the candidate transfer stations comprises:

determining a first movement path from the position of the robot to each of the candidate transfer stations, and taking the candidate transfer station corresponding to the first movement path that is shortest and does not pass through obstacles as the first target transfer station; and determining a second movement path from the position of the charging base to each of the candidate transfer stations, and taking the candidate transfer station corresponding to the second movement path that is shortest and does not pass through obstacles as the second target transfer station.

6. A device, comprising:

a memory configured to store executable instructions; and a processor configured to implement the robot pathfinding method according to claim 1 when executing the executable instructions stored in the memory.

7. A non-transitory computer-readable storage medium, comprising program code, wherein when the non-transitory computer-readable storage medium is run on an electronic device, the program code is used to enable the electronic device to perform the steps of the method according claim 1.

8. A robot pathfinding apparatus for driving a robot to a charging base, the apparatus comprising:

a first obtaining module configured to obtain a position of a robot and a position of a charging base in a grid map;

a second obtaining module configured to obtain a shortest path, the shortest path being from the position of the robot to the position of the charging base; and a first processing module configured to:

determine candidate transfer stations from the position of the robot to the position of the charging base if the shortest path passes through obstacles;

determine a first target transfer station corresponding to the position of the robot and a second target transfer station corresponding to the position of the charging base from the candidate transfer stations;

obtain all candidate transfer paths from the first target transfer station to the second target transfer station;

take the candidate path that is shortest and does not pass through obstacles as a target transfer path; and determine a target path from the position of the robot to the position of the charging base according to a path from the position of the robot to the first target transfer station, the target transfer path, and a path from the second target transfer station to the position of the charging base, wherein the apparatus drives the robot along the target path to the charging base, wherein the first processing module determines the candidate transfer starting from the position of the robot to the position of the charging base if the shortest path passes through obstacles by:

drawing a bounding rectangle of the grid map, and determining a first reference point on four edges of the bounding rectangle respectively;

offsetting a group of opposite edges of the bounding rectangle from a center of the bounding rectangle by a first preset step to obtain two offset edges;

taking four points of intersection of the two offset edges and edges of the grid map as second reference points, and offsetting the two second reference points on the same offset edge oppositely by a second preset step to obtain four third reference points; and taking the third reference points as the candidate transfer stations.

9. The apparatus according to claim 8, further comprising:

a determination module configured to determine whether the shortest path passes through obstacles; and a second processing module configured to determine that the shortest path is the target path from the position of the robot to the position of the charging base if the shortest path does not pass through obstacles.

* * * * *